Aug. 28, 1956     H. E. COOPER     2,760,424
DISK HARROW WITH STALK EJECTOR
Original Filed Jan. 25, 1951
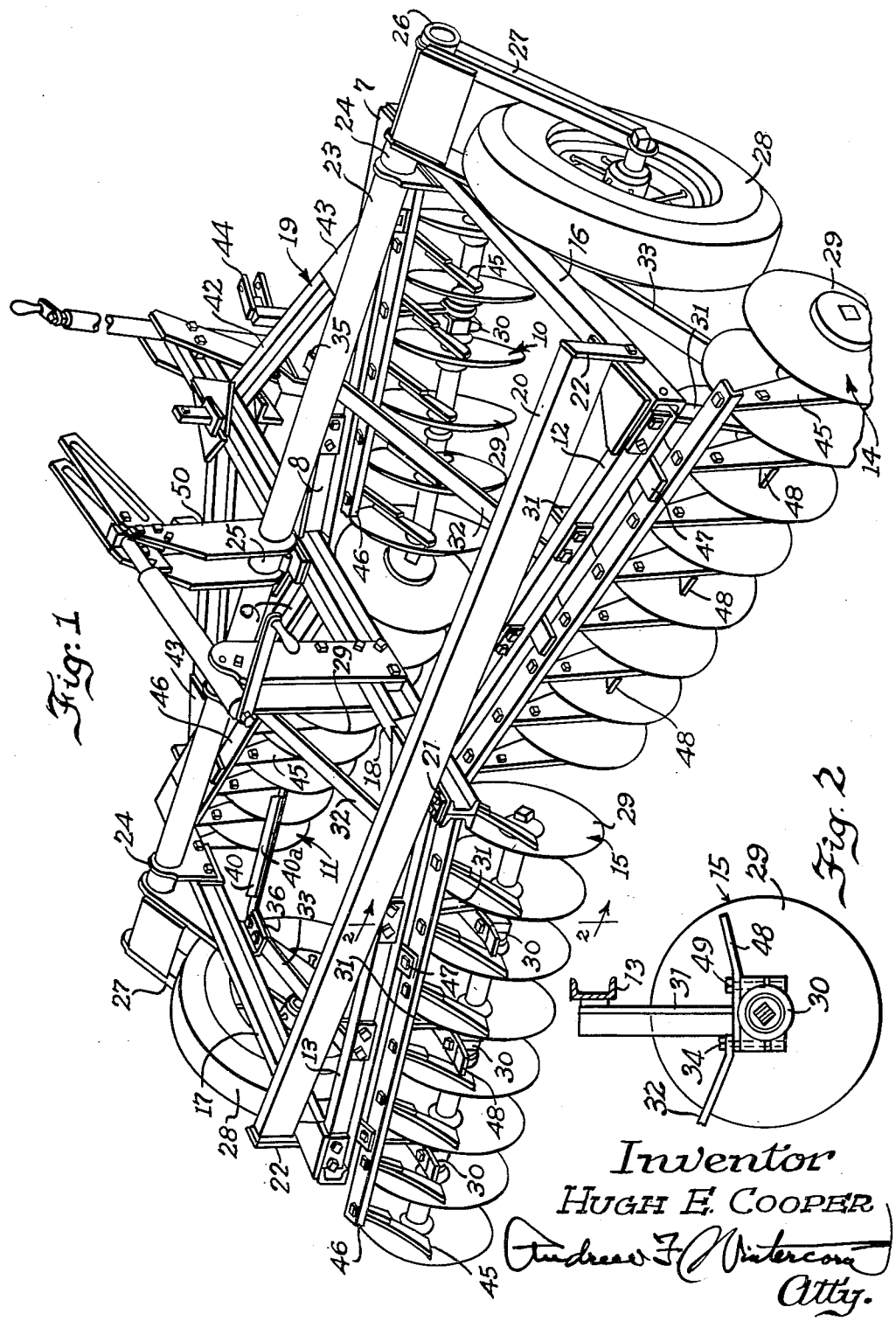
Inventor
HUGH E. COOPER
Atty.

United States Patent Office 2,760,424
Patented Aug. 28, 1956

2,760,424

DISK HARROW WITH STALK EJECTOR

Hugh E. Cooper, Rochelle, Ill.

Original application January 25, 1951, Serial No. 207,719. Divided and this application February 19, 1952, Serial No. 272,279

8 Claims. (Cl. 97—224)

This application is a division of my copending application, Serial No. 207,719, filed January 25, 1951.

This invention relates to improvements in disk harrows.

The principal object of my invention is to provide in a wheel mounted disk harrow, in which there are, as outlined in the parent application, front and rear pairs of gangs of colter disks suspended from a wheel-supported frame and braced by push and pull bars arranged in a novel manner, an improved stalk and root ejector in connection with standards that extend upwardly from the bearings for the gangs of disks, whereby to prevent roots, or other bulky objects, lodging at these standards and causing clogging.

The invention is illustrated in the accompanying drawings, in which—

Fig. 1 is a perspective view of a wheel-mounted disk harrow embodying my invention; and Fig. 2 is a sectional detail on the line 2—2 of Fig. 1, showing one of the root ejectors.

The same reference numerals are applied to corresponding parts in these two views.

Referring to Fig. 1, the reference numeral 7 designates the frame made from channel irons. The frame is of hour-glass form, so as to dispose the front cross-members 8 and 9 in parallelism with the axes of the front gangs 10 and 11, and dispose the rear cross-members 12 and 13 parallel to the axes of the rear gangs 14 and 15, respectively. Parallel side members 16 and 17 are suitably connected to the outer ends of the front and rear cross-members, and a central member 18, parallel to the side members, is suitably connected to the inner ends of the front and rear cross-members and extends forwardly from the frame to form the central part of the hitch 19. A reinforcing rear tie-channel 20 is connected at the middle to the rear end of the central member 18, as at 21, and at its opposite ends to the side members 16 and 17, as at 22, thereby greatly rigidifying and reinforcing the frame. A similar bolstering effect is obtained for the front cross-members 8 and 9 by the extension crosswise of the frame of the tubular wheel pivot shaft 23, which works in bearings 24 provided on the tops of the side members 16 and 17, and is also received at the middle thereof in a central pivot bearing 25 provided on top of the central member 18 of the frame, very near the junction with that member of the inner ends of the front cross-members 8 and 9. As a result of the sturdy construction of the frame and the way it is cross-braced at 20 and trussed at 23, there is no likelihood of the frame breaking, bending, or loosening up even in roughest service. The projecting end portions 26 of the shaft 23 carry the forks 27 in which the supporting wheels 28 are mounted, and, as will soon appear, provision is made for oscillating the shaft 23 relative to the frame 7 to raise and lower the frame and the gangs of disks with it, the frame being always raised to the same height for transportation, but being lowered to different degrees, according to the depth of disking desired. The shaft 23 is so located fore and aft of the frame that the harrow is substantially balanced relative to the wheels 28 when elevated for transportation, thereby reducing fatigue in hitching and unhitching and facilitating hauling.

The front and rear gangs of colter disks 10 and 11 are disposed in acute angle relationship to the central member 18, as clearly appears in Fig. 1, the front gangs being much closer together than the rear gangs. The front gangs are, in fact, as close together as possible without bringing the backs of the neighboring disks at the inner ends of the two gangs into contact, the disks 29 of these two gangs being arranged to throw dirt outwardly, whereas the disks 29 in the two rear gangs 14 and 15 are disposed the reverse way to throw dirt inwardly and thereby avoid ridging and obtain a better pulverizing and intermingling action. The front gangs 10 and 11 being so closely spaced are disposed substantially within the width of the frame 7, but the rear gangs 14 and 15, which have the same number of disks spaced the same distance, are disposed far enough apart so that the last two disks 29 on each of those gangs serve to remove the tracks that would otherwise be left in the field by the wheels 28 as the back gangs cover up for the front gangs. Each of the four gangs 10, 11, 14, and 15 is supported for rotation in three spaced coaxial bearings 30, which are carried on substantially vertical standards 31 extending downwardly from and suitably secured to the associated cross-member of the frame. The rear gangs each have a pair of pull or draw-bars 32 and 33 suitably attached at their rear ends, as at 34, to the innermost and outermost bearings 30 and extending forwardly and upwardly in acute angle relationship to the plane of the frame 7 and suitably connected at the front ends to the frame, the bars 32 being attached to the cross-members 8 and 9 near their inner ends, as at 35, and the bars 33 being attached to the side members 16 and 17 at the approximate midpoints thereof, as indicated at 36. Each of the front gangs 10 and 11 similarly has a pull or draw-bar attached at its rear end to the innermost bearing 30, and extending forwardly and upwardly, and attached at its front end to the hitch extension 19 of the frame. A push-bar 40 is also provided in connection with each of the front gangs 10 and 11, these bars being attached at their front ends to the outermost bearings 30, the push-bars extending rearwardly and upwardly as well as outwardly and being attached at their rear ends to the side members 16 and 17 of the frame, as at 36. The pull and push-bars brace the structure and relieve the standards 31 of most of the strain incident to the plowing action of the disks, the pull-bars being, of course, tension members and the push-bars compresson members. That is the reason for providing the longitudinal flanges 40a on the push-bars to prevent buckling thereof under compression loading. The advantages of this construction and arrangement of elements are all fully set forth in the parent application. For the present purposes it will suffice to point out that the arrangement of the push bars 40 relative to the hitch extension results in good distribution of the pull, part of the pull being assumed as tension loading by the hitch extension 19, to which the pull-bars extending to the inner ends of the front gangs are attached, and the rest being assumed by compression loading on the push-bars 40. The pull so far as the rear gangs are concerned is also nicely distributed, inasmuch as the inner pull-bars 32 are attached to the cross-members 8 and 9 near their inner ends where they are anchored to the central member 18, and the outer pull-bars 33 are attached to the side members 16 and 17 of the frame, and, of course, the hitch extension 19 is connected to the front end of the frame near these side members, as at 43.

The usual scraper blades 45 are provided in connection with all of the disks 29, and they are attached to channel iron members 46 attached to the cross-members 12—13 and 8—9 by means of lugs 47. In addition, however, I provide in accordance with my invention a root ejector blade 48 in connection with each of the three standards 31 fastened to the top of the bearing 30, as indicated at 49, and extending rearwardly and upwardly at a small angle from the horizontal. These projecting blades 48 prevent corn stalk roots, stones, or any other bulky objects from lodging between the neighboring disks against the backs of the standards and either placing an undesirable drag upon the operation of the harrow or preventing turning of the disks entirely. The roots, stones, and other objects coming in contact with the blades 48 are deflected rearwardly away from the disks harmlessly.

It is believed the foregoing description conveys a good understanding of the objects and advantages of my invention. The appended claims have been drawn to cover all legitimate modifications and adaptations.

I claim:

1. In a disk harrow comprising a gang of coaxially spaced colter disks mounted on a shaft for rotation, coaxial bearings spaced lengthwise of the gang supporting said shaft, and a longitudinally extending support above the gang having depending arms attached to the bearings for support thereof, the improvement consisting in the provision of rigid elongated stalk ejector blades of appreciable width on said bearings disposed for use of the faces thereof and projecting rearwardly therefrom in relation to the forward travel of the gang of disks toward but in laterally spaced relation to the periphery of the adjacent disks between which the bearings are located.

2. In a disk harrow comprising a gang of coaxially spaced colter disks mounted on a shaft for rotation, coaxial bearings spaced lengthwise of the gang supporting said shaft, and a longitudinally extending support above the gang having depending arms attached to the bearings for support thereof, the improvement consisting in the provision of rigid elongated stalk ejector blades of appreciable width on said bearings disposed for use of the faces thereof and projecting rearwardly therefrom in relation to the forward travel of the gang of disks between the adjacent disks between which the bearings are located, the said stalk ejectors being inclined upwardly relative to the bearings generally in a radial direction with respect to the shaft and disks and disposed in laterally spaced relation to said disks.

3. In a disk harrow comprising a frame, a gang of coaxially spaced colter disks mounted on a shaft for rotation beneath said frame, and coaxial bearings spaced lengthwise of the gang for support of the shaft, the improvement consisting in the provision of an elongated bar attached at one end to the frame and inclined downwardly therefrom and attached at the other end to one of said bearings, and a rigid elongated stalk ejector blade of appreciable width disposed for use of the flat face thereof and fastened at its one end on said bearing and projecting rearwardly therefrom in relation to the forward travel of the gang of disks toward but in laterally spaced relation to the periphery of the adjacent disks between which the bearing is located.

4. In a disk harrow comprising a frame, a gang of coaxially spaced colter disks mounted on a shaft for rotation beneath said frame, and coaxial bearings spaced lengthwise of the gang for support of the shaft, the improvement consisting in the provision of an elongated bar attached at one end to the frame and inclined downwardly therefrom and attached at the other end to one of said bearings, and a rigid elongated stalk ejector blade of appreciable width disposed for use of the flat face thereof and fastened at its one end on said bearing and projecting toward but in laterally spaced relation to the periphery of the adjacent disks between which the bearing is located, the bar extending forwardly and the stalk ejector blade rearwardly from the bearing in relation to the forward travel of the gang of disks.

5. In a disk harrow comprising a frame, a gang of coaxially spaced colter disks mounted on a shaft for rotation beneath said frame, and coaxial bearings spaced lengthwise of the gang for support of the shaft, the improvement consisting in the provision of an elongated bar attached at one end to the frame and inclined downwardly therefrom and attached at the other end to one of said bearings, and a rigid elongated stalk ejector blade of appreciable width disposed for use of the flat face thereof and fastened at its one end on said bearing and projecting rearwardly therefrom in relation to the forward travel of the gang of disks toward but in laterally spaced realtion to the periphery of the adjacent disks between which the bearing is located, and an upright bearing support depending from the frame and rigid with the top of the bearing.

6. In a disk harrow comprising a frame, a gang of coaxially spaced colter disks mounted on a shaft for rotation beneath said frame, and coaxial bearings spaced lengthwise of the gang for support of the shaft, the improvement consisting in the provision of an elongated bar attached at one end to the frame and inclined downwardly therefrom and attached at the other end to one of said bearings, and a rigid elongated stalk ejector blade of appreciable width disposed for use of the flat face thereof and fastened at its one end on said bearing and projecting toward but in laterally spaced relation to the periphery of the adjacent disks between which the bearing is located, the bar extending forwardly and the stalk ejector blade rearwardly from the bearing in relation to the forward travel of the gang of disks, and a bearing support rigid with and projecting upwardly from the bearing and secured to the frame.

7. In a disk harrow comprising a frame, a gang of coaxially spaced colter disks mounted on a shaft for rotation beneath said frame, and coaxial bearings spaced lengthwise of the gang for support of the shaft, the improvement consisting in the provision of an elongated bar attached at one end to the frame and inclined downwardly therefrom and attached at the other end to one of said bearings, and a rigid elongated stalk ejector blade of appreciable width disposed for use of the flat face thereof and fastened at its one end on said bearing and projecting rearwardly therefrom in relation to the forward travel of the gang of disks toward but in laterally spaced relation to the periphery of the adjacent disks between which the bearing is located, the stalk ejector blade being upwardly inclined so as to deflect stalks, roots, stones and the like rearwardly away from the disks.

8. In a disk harrow comprising a gang of coaxially spaced colter disks mounted on a shaft for rotation, coaxial bearings spaced lengthwise of the gang supporting said shaft, and a longitudinally extending support above the gang having depending arms attached to the bearings for support thereof, the improvement consisting in the provision of rigid elongated stalk ejector blades of appreciable width on said bearings disposed for use of the flat faces thereof and projecting rearwardly therefrom in relation to the forward travel of the gang of disks toward but in laterally spaced relation to the periphery of the adjacent disks between which the bearings are located, the stalk ejector blades being upwardly inclined so as to deflect stalks, roots, stones and the like rearwardly away from the disks.

References Cited in the file of this patent

UNITED STATES PATENTS

| Number | Name | Date |
|---|---|---|
| 238,654 | Corbin | Mar. 8, 1881 |
| 337,773 | La Dow | Mar. 9, 1886 |
| 493,182 | Platt | Mar. 7, 1893 |
| 598,820 | Tharp | Feb. 8, 1898 |
| 832,225 | Wright | Oct. 2, 1906 |
| 1,457,960 | Britten | June 5, 1923 |
| 1,830,761 | Johnson et al. | Nov. 10, 1931 |
| 2,286,305 | Priestley | June 16, 1942 |